US011320291B2

(12) United States Patent
Alemohammad et al.

(10) Patent No.: US 11,320,291 B2
(45) Date of Patent: May 3, 2022

(54) MULTI-PARAMETER DISTRIBUTED FIBER OPTIC SENSOR SYSTEM AND METHODS OF SENSOR MANUFACTURING

(71) Applicant: ADVANCED OPTO-MECHANICAL SYSTEMS AND TECHNOLOGIES INC., Toronto (CA)

(72) Inventors: Hamid Alemohammad, Vaughan (CA); Richard Liang, Kitchener (CA); Amir Azhari, North York (CA)

(73) Assignee: ADVANCED OPTO-MECHANICAL SYSTEMS AND TECHNOLOGIES INC., Toronto (CA)

( * ) Notice: Subject to any disclaimer, the term of this patent is extended or adjusted under 35 U.S.C. 154(b) by 0 days.

(21) Appl. No.: 17/113,618

(22) Filed: Dec. 7, 2020

(65) Prior Publication Data

US 2021/0116266 A1 Apr. 22, 2021

Related U.S. Application Data

(62) Division of application No. 16/006,027, filed on Jun. 12, 2018, now Pat. No. 10,859,411.

(Continued)

(51) Int. Cl.
*G01D 5/353* (2006.01)

(52) U.S. Cl.
CPC ..... *G01D 5/35358* (2013.01); *G01D 5/35316* (2013.01)

(58) Field of Classification Search
CPC .............. G01D 5/35358; G01D 5/35316
See application file for complete search history.

(56) References Cited

U.S. PATENT DOCUMENTS

| 5,177,805 A | 1/1993 | Groger et al. |
| 6,016,702 A | 1/2000 | Maron |

(Continued)

FOREIGN PATENT DOCUMENTS

| EP | 1137920 B1 | 4/2001 |
| WO | 2016182429 A1 | 11/2016 |

OTHER PUBLICATIONS

International Search Report dated Oct. 18, 2018 for Corresponding International PCT Patent Application No. PCT/CA2018/050697; 5 Pages.

(Continued)

*Primary Examiner* — Seung C Sohn

(57) ABSTRACT

In accordance with embodiments there is provided manufacturing processes for fibre optic sensors. In an example, a portion of a fiber optic cable is coated with a thin film layer and placed in a channel of a fiber carrying flexible member for a fiber optic sensor. The portion is embedded in the channel using one of: a thermal curing process after filling the channel with a metallic liquid suspension or polymeric adhesive; and an electroplating or electroless plating process. Filling the channel may comprises performing a controlled dispensing using an automated process such as a drop-on-demand deposition process. In an example, a fiber optical cable is placed in a channel of a flexible member. Micro-laser welding or electron beam welding is used to locally melt the member areas adjacent to the cable resulting in the flow of liquid around the fiber creating a solid structure with embedded fiber after solidification.

6 Claims, 19 Drawing Sheets

Related U.S. Application Data

(60) Provisional application No. 62/518,101, filed on Jun. 12, 2017.

(56) References Cited

U.S. PATENT DOCUMENTS

| | | |
|---|---|---|
| 8,706,305 B2 | 4/2014 | Jiang et al. |
| 10,077,649 B2 * | 9/2018 | LeBlanc .................. E21B 47/06 |
| 10,161,924 B2 * | 12/2018 | Chavez .................. G01D 5/268 |
| 2013/0145852 A1 | 6/2013 | Guida et al. |
| 2014/0123764 A1 | 5/2014 | Abtahi et al. |
| 2017/0089187 A1 | 3/2017 | Hytken |

OTHER PUBLICATIONS

Written Opinion dated Oct. 18, 2018 for Corresponding International PCT Patent Application No. PCT/CA2018/050697; 7 Pages.

* cited by examiner

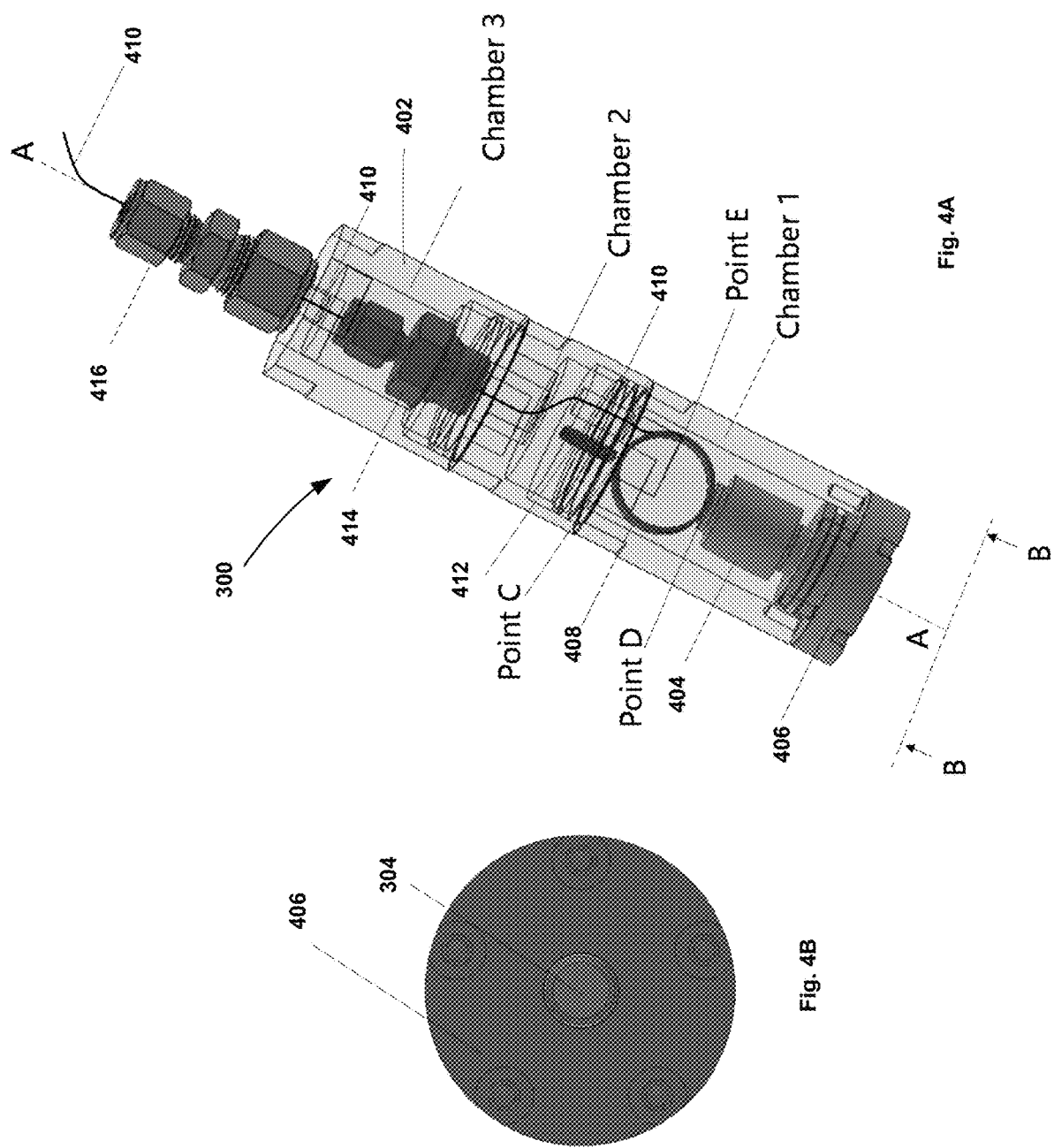

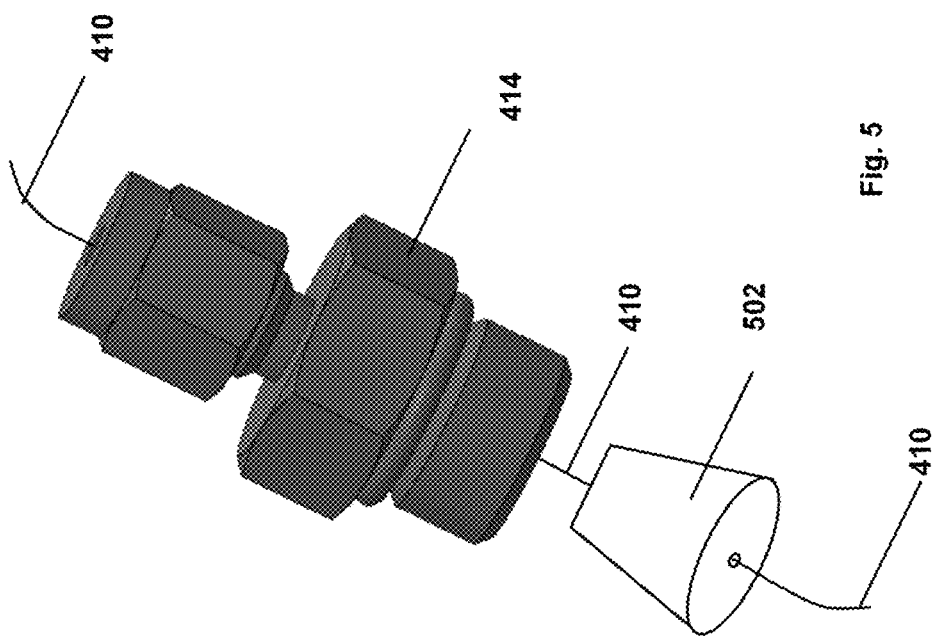

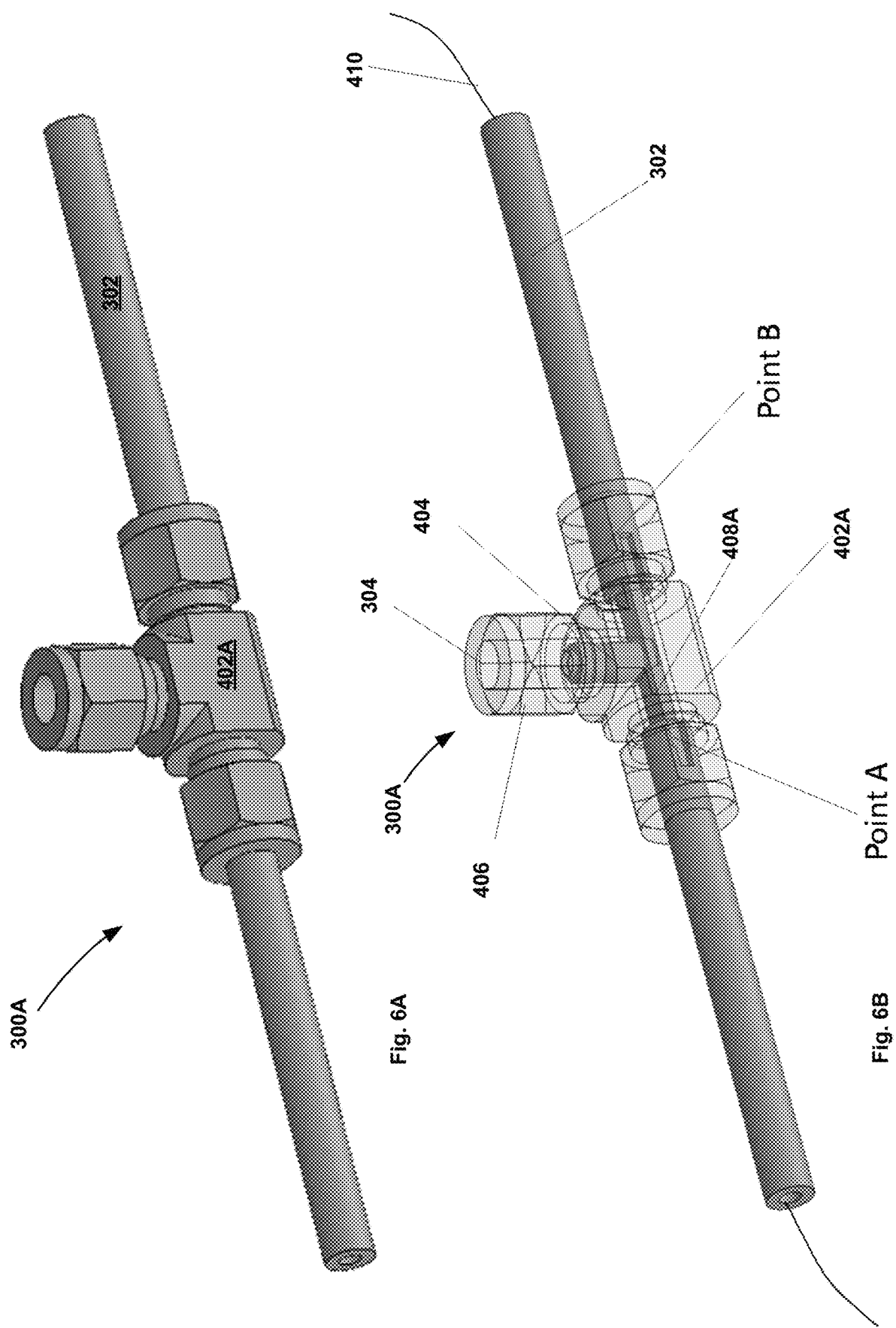

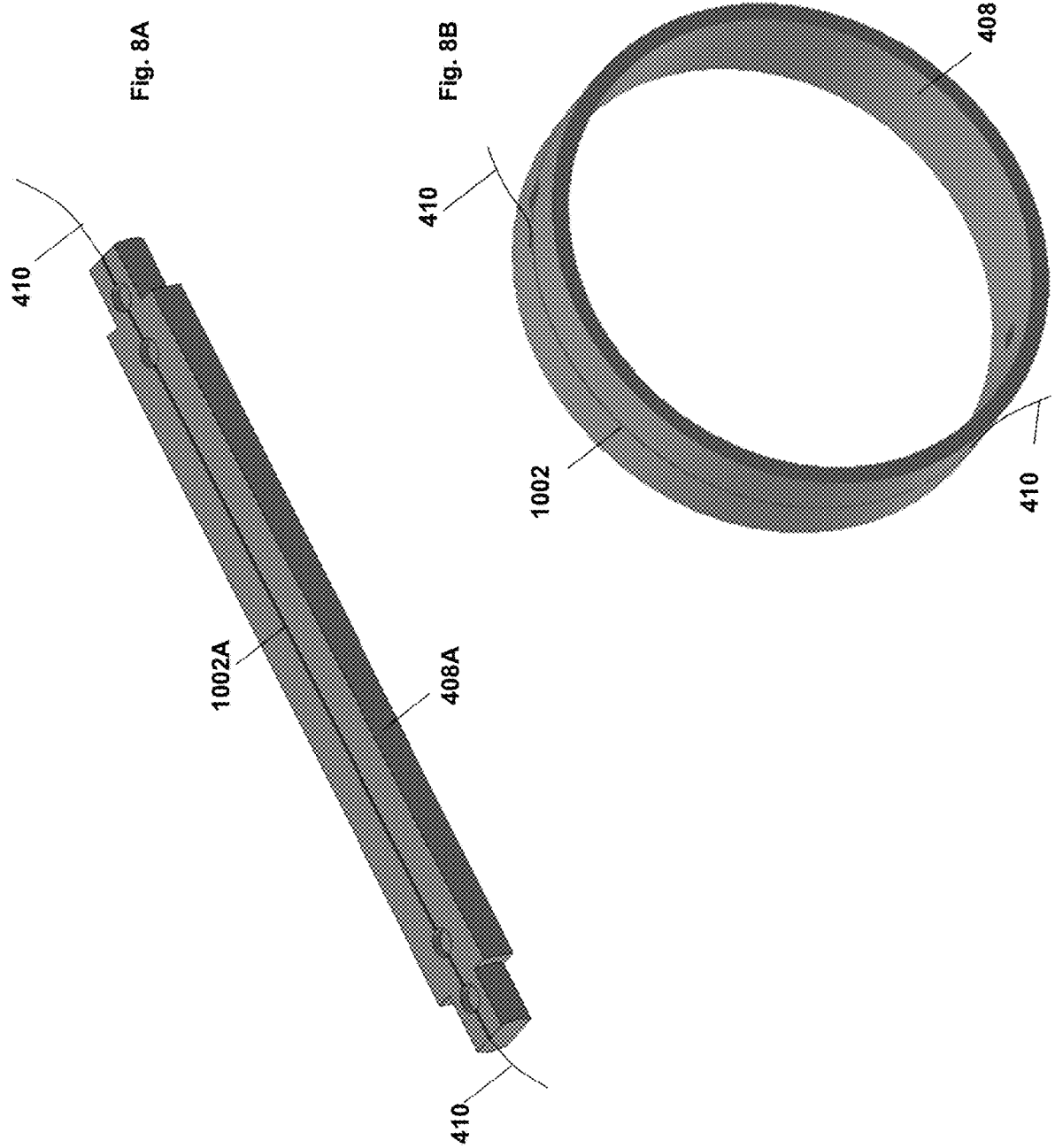

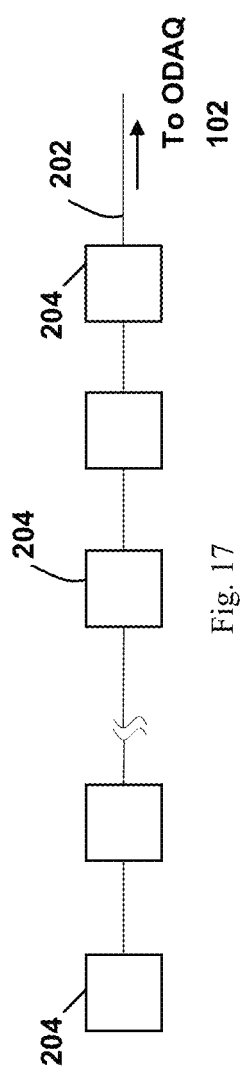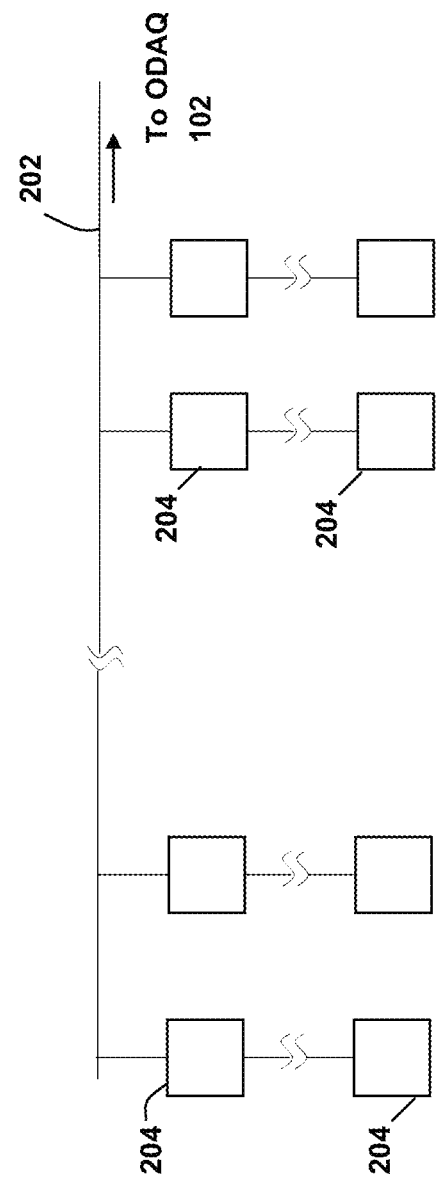
Fig. 17
Fig. 18

MULTI-PARAMETER DISTRIBUTED FIBER OPTIC SENSOR SYSTEM AND METHODS OF SENSOR MANUFACTURING

CROSS-REFERENCE

This application is a divisional of parent application U.S. Ser. No. 16/006,027 filed Jun. 12, 2018, which parent application claims the benefit of U.S. Provisional Application No. 62/518,101 filed Jun. 12, 2017, the contents of which parent application and which provisional application are respectively incorporated herein by reference in their entireties.

FIELD OF THE DISCLOSURE

The current disclosure is directed at fiber optic sensors, i.e., methods and apparatus, for distributed monitoring of a multitude of physical parameters along a single fiber optic cable. Simultaneous measurement of temperature, liquid and gas pressure, vibration, mechanical strain, liquid level, liquid flow rate, and deformation in a distributed fashion generates a 3-D environmental data map.

BACKGROUND

Since their inception, fiber optic sensors have been used in several industries for performance monitoring, process control, condition monitoring, and failure diagnostics. The competitive advantages of fiber optic sensors versus electronic based sensors can be realized by consolidating multi-parameter sensing in a single strand of fiber optic cable and having it collect as much information as possible from its surrounding environment. Fiber optics, by its nature, is simultaneously sensitive to a multitude of parameters (i.e., strain and temperature) in such a way that independent parameter measurement requires the use of complicated compensation mechanisms or the use of additional sensors. Over the past decades, many approaches have been taken by the research community to solve this problem; examples are a thermal fiber optic packages for temperature compensation, on-fiber thin film coatings, laser microstructured fiber optics, etc. The majority of the proposed approaches are only applicable for compensating unwanted parameters without the capability for multi-parameter sensing. Many of the proposed solutions for multi-parameter sensing are so complicated that compromise the performance of fiber optic sensor technology in harsh environment sensing. Additionally, the proposed solutions are mostly limited to a special type of fiber optic sensor and cannot be extended to a variety of fiber optic sensor technologies. As an example, proposed approaches for temperature compensation of Fiber Bragg Gratings (FBG) are not usable with distributed fiber optic strain sensors based on Rayleigh scattering.

SUMMARY OF THE DISCLOSURE

Fiber optic sensors for distributed monitoring of physical parameters along a fiber optic cable are disclosed. A sensor comprises a fiber optic cable mounted to a flexible member disposed in a sensor housing body. The flexible member is coupled to the body and to a bladder in the body. The bladder is exposed to an immediate external environment to the sensor through a port in the body so that changes in pressure or liquid level in the environment cause changes to the size of the bladder, which in turn change the shape of the flexible body to impart mechanical strain on the cable. The cable may be inscribed by fiber Bragg gratings. Changes in spectra may be analyzed to measure the physical parameters.

There is disclosed a combination of a fiber optic cable sensor, optical data acquisition system (ODAQ), and optical data analysis algorithm which is configured to measure and report environmental/physical parameters such as temperature, liquid and gas pressure, vibration, mechanical strain, liquid level, liquid flow rate, and deformation in an environment about the sensor. When a plurality of fiber optic cable sensors are distributed in an environment, such as in an array, the measurements may generate a 3-dimensional map of the physical parameters.

The fiber optic sensor system may have a multitude of fiber optic cables and one ODAQ, where at each point on each cable a multitude of parameters including but not limited to temperature, liquid and gas pressure, vibration, mechanical strain, liquid level, and deformation are measured simultaneously.

The fiber optic sensor may be encapsulated in a metallic or non-metallic structure at multiple points where each point has the capability to measure a multitude of parameters including but not limited to temperature, liquid and gas pressure, vibration, mechanical strain, liquid level, and deformation to generate a 3D map of these parameters.

The metallic or non-metallic structure is a combination of moving and stationary parts/components, called sub-components, linked together and at least one section of the optic fiber is embedded, encapsulated, or bonded to a moving or stationary part.

The fiber can be embedded, encapsulated, or bonded to multiple moving or stationary parts at multiple locations in a single metallic or non-metallic structure.

The sub-components are made of metallic or non-metallic materials.

The fiber is bonded, embedded, or encapsulated in the moving or stationary parts using a multitude of methods including polymeric adhesive bonding, conductive adhesives (i.e., conductive epoxies), electroplating, electroless plating, brazing, low temperature soldering, and low-temperature casting.

The fiber optic to be embedded, encapsulated, or bonded could be pre-coated with layers of polymer (polyimide or Acrylate coating), metal layer or a combination of both, called coating seed layers. It could also be a pure glass without any coating.

The sensor sensitivity is a function of the geometry and material properties of the coating seed layers and the moving and stationary parts on which the fiber is bonded or embedded.

The metallic and non-metallic components are designed in such a way that each section of the fiber optic, embedded, encapsulated, or bonded to these components will be exposed to changes in temperature or mechanical strain. Other parameters to be measured manifest themselves as changes in temperature or strain in the fiber optic.

The fiber optic disclosed in this invention can be single mode or multi-mode fiber, single-core or multi-core fibers, pure silica fiber, germanium-doped core fiber, hydrogen loaded glass fiber, fluorine loaded cladding fiber, polymer optical fiber (POF), and polarization-maintaining (PM) fiber. The fiber could also be made by splicing a multitude of all these types of fibers together.

The sections of the fiber optic embedded, encapsulated, or bonded may be one or a multitude of in-fiber pre-built fiber Bragg gratings (FBGs). The FBGs optical responses are interrogated either through the reflection or transmission of the optical waves passing through the fiber optic.

The sections of the fiber optic embedded, encapsulated, or bonded may be one or a multitude of in-fiber Fabry-Perot interferometers (also known as fiber Fabry-Perot cavity), where each in-fiber Fabry-Perot interferometer is made of two reflection planes separated by a known distance and where the reflection planes are in-fiber Bragg gratings.

The sections of the fiber optic embedded, encapsulated, or bonded may have no in-fiber structures and the sensing of external parameters may be based on the scattering of light from the optical fiber including, Raman scattering, Rayleigh scattering, and Brillouin scattering.

At least one section of the fiber optic embedded, encapsulated, or bonded may be made of Photonic Crystal Fiber (PCF).

At least one section of the fiber optic embedded, encapsulated, or bonded may be made of microstructured fiber optic.

Simultaneous measurement of multiple parameters may be achieved by compensating the effect of one parameter from the other one. This is achieved by special design of the metallic or non-metallic structure in a way that there is a strain or temperature gradient on the bonded section of the optical fiber. Different magnitudes of strain and temperature may be applied to different sections of the embedded or bonded optical fiber in such a way that each section is only sensitive to one parameter or each section has a unique sensitivity to these parameters.

The metallic or non-metallic structure may have one or multiple flexible/deformable components and the fiber optic may be bonded, encapsulated, bonded to at least one of the flexible components.

At least one of the flexible components may react to the changes in measured parameters, i.e., pressure, liquid level, vibration, external force, etc. The flexible components may be connected to each other in such a way that the deformation of one flexible component is transferred to the other flexible components and eventually to the bonded or embedded sections of the fiber optic.

In an application, the fiber optic sensor system may be applied for subterranean measurements, especially for soil and groundwater monitoring.

In an application, the fiber optic sensor system may be applied for the measurements of soil and groundwater during a remediation process including in-situ thermal remediation, ex-situ-thermal remediation, thermal desorption, air sparging, bioremediation, electrokinetic remediation, in-situ flushing, permeable reactive barriers, phytoremediation, pump-and-treat remediation, soil vapor extraction, and solidification and stabilization techniques.

In such an application, the measured parameters may be temperature, groundwater level, and hydraulic gradient.

Level measurement may be achieved through hydrostatic pressure measurement. As a result, the level sensor may be a pressure sensor with the capability of sensing small changes in pressure due to the changes in liquid level.

There is provided a fiber optic cable sensor for measuring physical parameters in an immediate environment external to the sensor. The sensor comprises: a housing body; a first flexible member; a second flexible member; and a fiber optic cable; wherein: the first flexible member is housed in the body with a first surface of the first flexible member exposed at one end, through a port in the body, with the immediate external environment to the sensor, the first flexible member changing size (expanding or collapsing) in response to changes in pressure or level of liquid in the immediate external environment; the second flexible member is coupled to and housed in the body and further coupled to a second surface of the first flexible member such that a change in the size of the first flexible member changes a shape of the second flexible member; a portion of the fiber optic cable, disposed in the body, is mounted in or embedded to the second flexible member so that the change in the shape of the second flexible member imparts a mechanical strain (deformation) along the portion of the fiber optic cable; and at least one end of the fiber optic cable extends out through the body.

The cable may be embedded in the second flexible member. The cable may be mounted to or embedded in the second flexible member at multiple points. The cable may be embedded in a channel in the second flexible member, having a preferred channel depth between 50 $\mu$m and 1 mm. The cable may be mounted on or embedded in the second flexible member so that strain is distributed unevenly along the portion of the fiber optic cable.

The portion of the cable may comprises a thin film layer, preferably having a coating thickness between 20 nm and 10 $\mu$m. The portion of the cable is inscribed with at least one fiber Bragg grating (FBG). The portion of the cable may be mounted at multiple points and wherein: each point comprises a part of a single FBG or the entire FBG; or each point comprises a different FBG Bragg wavelength.

A portion of the cable that is used as a sensor may be made of in-fiber Fabry-Perot interferometers (also known as fiber Fabry-Perot cavity), where each in-fiber Fabry-Perot interferometer is made of two reflection planes separated by a known distance and where the reflection planes are in-fiber Bragg gratings.

Backscattered light (including Raman scattering, Rayleigh scattering, and Brillouin scattering) from the portion of the cable used as sensor may be collected and analyzed for sensing.

The second flexible member may be sealed from the external environment.

The body may comprise multiple chambers with a first chamber housing the first flexible member and second flexible member. The fiber cable may extend from the first chamber and then exit the body through a sealed liquid/gas fitting.

The second flexible member may be a beam, each end of which beam is mounted to the body. The fiber optic cable may extend longitudinally along a length of the beam, both ends of which cable extend out through the body. The first flexible member may be mounted perpendicularly to a longitudinal axis of the beam.

The second flexible member may be a ring or tube with the fiber optic cable mounted along at least a portion of an exterior surface of the ring or tube. When the second flexible member is a flexible tube, the fiber optic cable may be mounted along at least a portion of the exterior surface of the tube in a straight or spiral shape.

There is provided a length of fiber optic cable comprising a plurality of sensors in accordance with any one of the examples provided spaced along a length of the fiber optic cable and configured in a serial or star configuration.

There is provided a fiber optic sensor system comprising: an optical data acquisition system (ODAQ) configured to generate light and detect optical power; and, coupled the ODAQ, at least one fiber optic sensor or fiber optic cable comprising a plurality of sensors in accordance with any one of the examples provided. The ODAQ may be combined with (example, coupled to or defined to comprise) a microelectromechanical switch to monitor multiple fiber optic cables, the switch controlled by a processing unit to generate a sequence of switching for example to define a 3D data map.

The fiber optic sensors may be inscribed with fiber Bragg gratings (FBG) and wherein the ODAQ analyses each FBG reflection spectrum based on the following parameters to measure physical parameters: a) Shift of Bragg wavelength ($\lambda_B$); b) Change in the bandwidth of the reflection spectrum, i.e. Full Width at Half Maximum (FWHM); c) Area under the reflection spectrum ($A_{ref}$); and d) Intensity of side lobes in the reflection spectrum ($1_1^+$, $1_1^-$); and, wherein preferably the physical parameters comprise any one or more of: temperature, liquid and gas pressure, vibration, mechanical strain, liquid level, and deformation and further preferably the ODAQ generates a 3D data map of the physical parameters.

The fiber optic sensor system may be configured as a component of an in-situ thermal remediation system to provide at least one of: i) process performance monitoring and ii) feedback control of the remediation process. The in-situ thermal remediation system may be configured to remediate a ground environment in accordance with a process using any one of electric resistance heating (ERH), thermal conduction heating (TCH), steam-enhanced extraction (SEE), and gas thermal heating.

There is provided a process of manufacturing comprising: coating a portion of a fiber optic cable with a thin film layer; placing the fiber optical cable as coated in a channel of a fiber carrying flexible member for a fiber optic sensor; and embedding the cable as coated in the channel using one of: a thermal curing process after filling the channel with a metallic liquid suspension or polymeric adhesive; and an electroplating or electroless plating process. The thin film layer may be a conductive thin film layer. Filling the channel may comprise performing a controlled dispensing using an automated process, such as an automated drop-on-demand deposition process. The process of manufacturing may comprise: assembling the fiber carrying flexible member and cable, as embedded, in a housing body with an expanding/collapsing capable flexible member; wherein a first surface of the expanding/collapsing capable flexible member is exposed at one end, through a port in the body, with the immediate external environment to the sensor, the expanding/collapsing capable flexible member changing size (expanding or collapsing) in response to changes in pressure or level of liquid in the immediate external environment; wherein the fiber carrying flexible member is coupled to and housed in the body and further coupled to a second surface of the expanding/collapsing capable flexible member such that an expanding or collapsing of the expanding/collapsing capable flexible member changes a shape of the fiber carrying flexible member; and wherein at least one end of the fiber optic cable extends out through the body.

There is provided process of manufacturing comprising: placing a coated or uncoated fiber optical cable in a channel of a flexible member for a fiber optic sensor; and using micro-laser welding or electron beam welding to locally melt the flexible membrane areas adjacent to the fiber optic resulting in the flow of the melted liquid around the fiber to create a solid structure with embedded fiber after solidification.

There is provided a process comprising: performing in-situ thermal remediation using an in-situ thermal remediation system according to a remediation process using thermal heating, the in-situ thermal remediation system having as a component a fiber optic system of as provided herein; and performing at least one of i) process performance monitoring and ii) feedback control of the remediation process using the fiber optic sensor system. The thermal heating may comprise any one of electric resistance heating (ERH), thermal conduction heating (TCH), steam-enhanced extraction (SEE), and gas thermal heating.

These and other aspects, features and characteristics will be apparent to one of ordinary skill in the art.

DESCRIPTION OF THE DRAWINGS

One or more examples of the various aspects disclosed are illustrated in the drawings in which:

FIGS. 4A and 4B are schematic diagrams of a pressure/level and temperature sensor transducer;

FIG. 5 shows the details of the fiber optic seal fitting connecting Chamber 2 to Chamber 3;

FIGS. 6A and 6B are CAD illustrations of an optical fiber pressure/level and temperature sensor according to an example.

FIGS. 8A and 8B shows examples of flexible components (beam and ring) in which sections of the fiber optic cable are embedded;

FIG. 17 is a schematic diagram of distributed or multi-point sensing in serial configuration;

FIG. 18 is a schematic diagram of distributed or multi-point sensing in star configuration;

DETAILED DESCRIPTION

Figure 1:
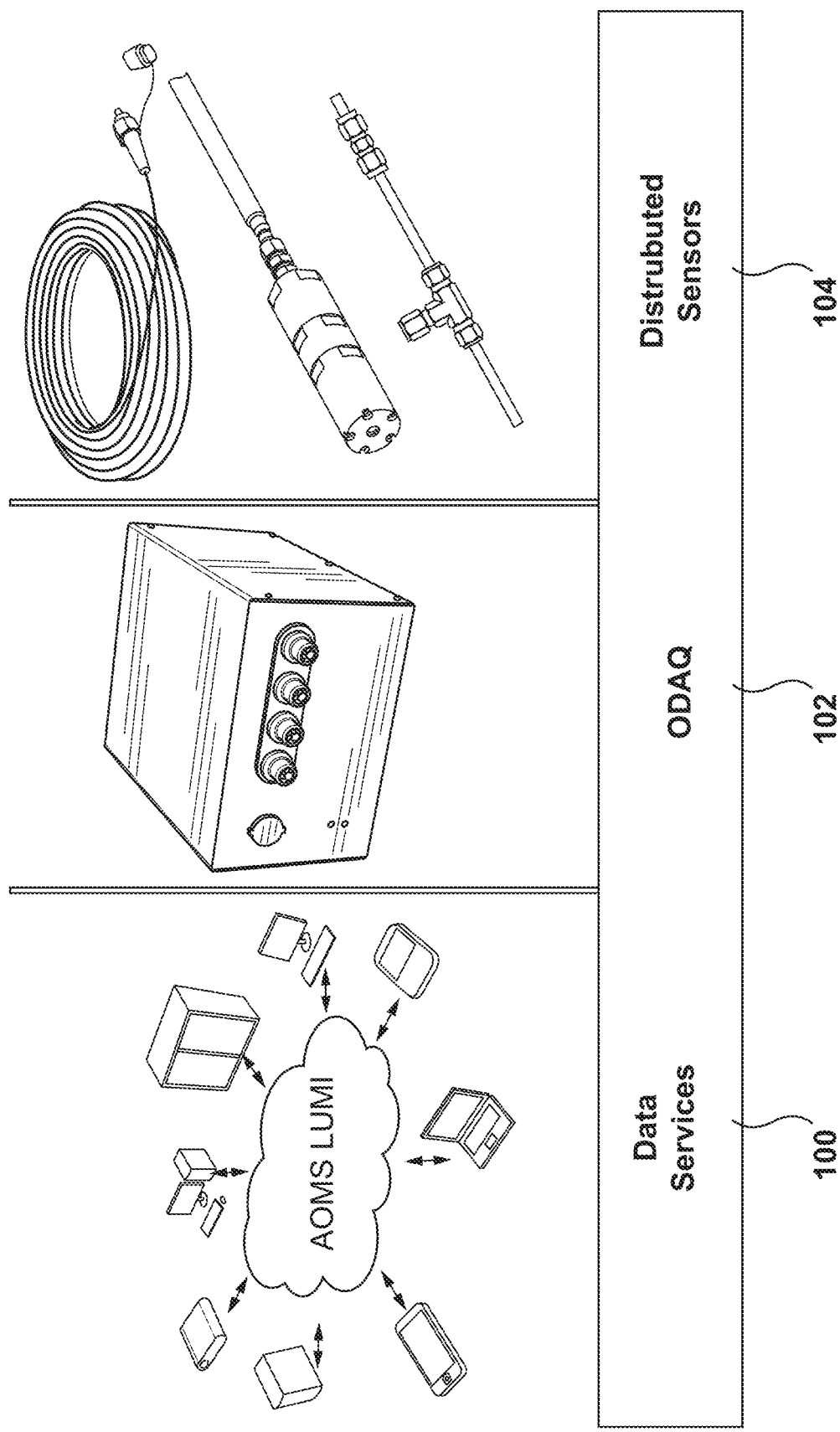
FIG. 1 is a schematic diagram of fiber optic sensing system which includes fiber optic cable, optical data acquisition system (ODAQ), and software and data services (i.e., algorithm)

FIG. 1 shows selected components of a system and services for the environmental measurement of various parameters using fiber optic sensors according to one example. FIG. 1 shows data services 100 (for example, to receive and utilize the measurements among other purposes), an optical data acquisition system (ODAQ) 102 (for example, to determine the measurements) and distributed sensors 104 connectable to ODAC 102 via fiber optic cables (for example, to generate signals with which to determine the measurements). The trademark AOMS Technologies, in word or design form, and the trademark AOMS LUMI are trademarks of Advanced Opto-Mechanical Systems and Technologies Inc. and all rights are reserved.

Figure 2:
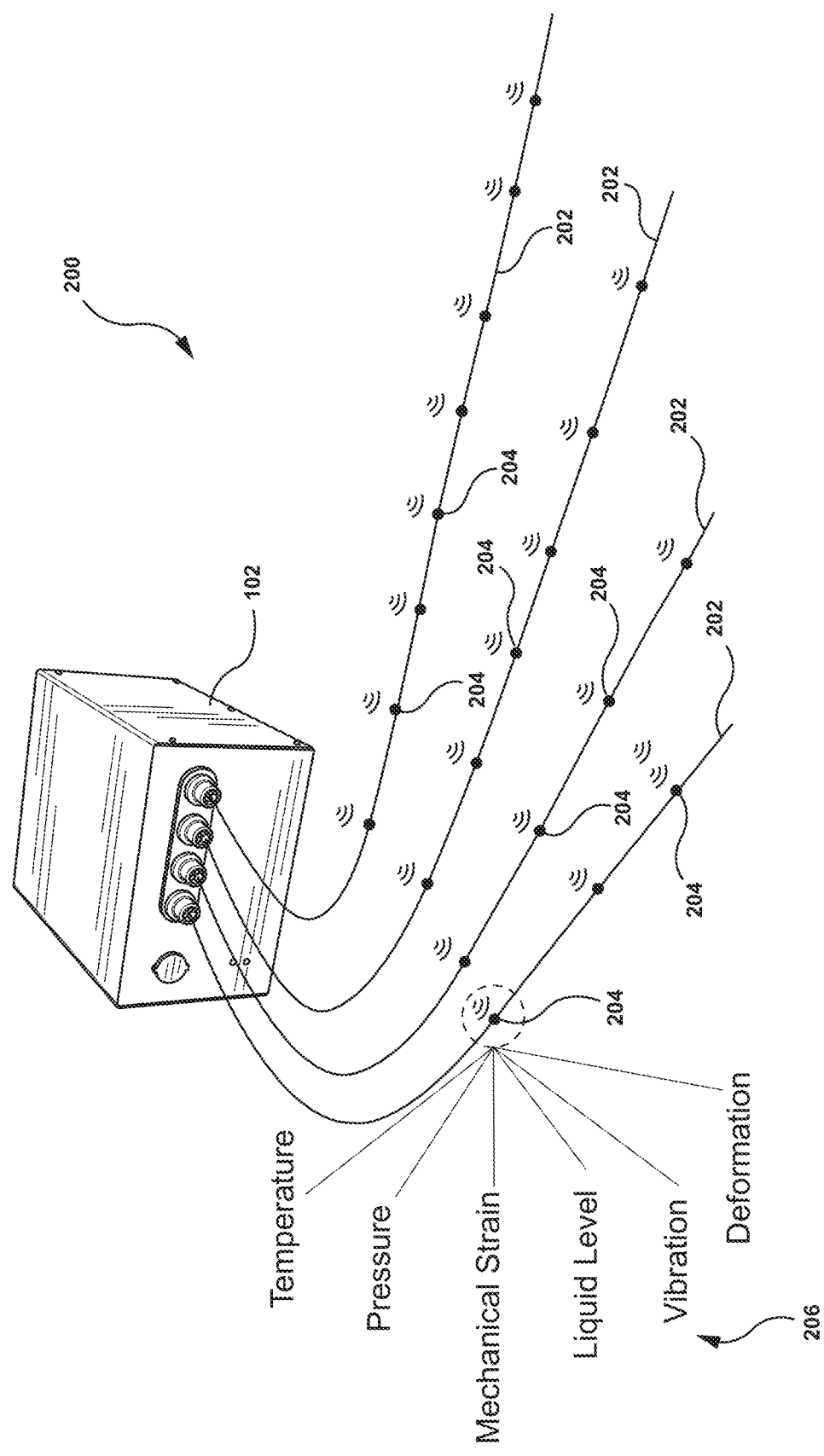
FIG. 2 is a schematic diagram of fiber optic sensing system with multiple fibers where at each point on each cable a multitude of parameters including but not limited to temperature, liquid and gas pressure, vibration, mechanical strain, liquid level, and deformation are measured simultaneously.
Figure 3:
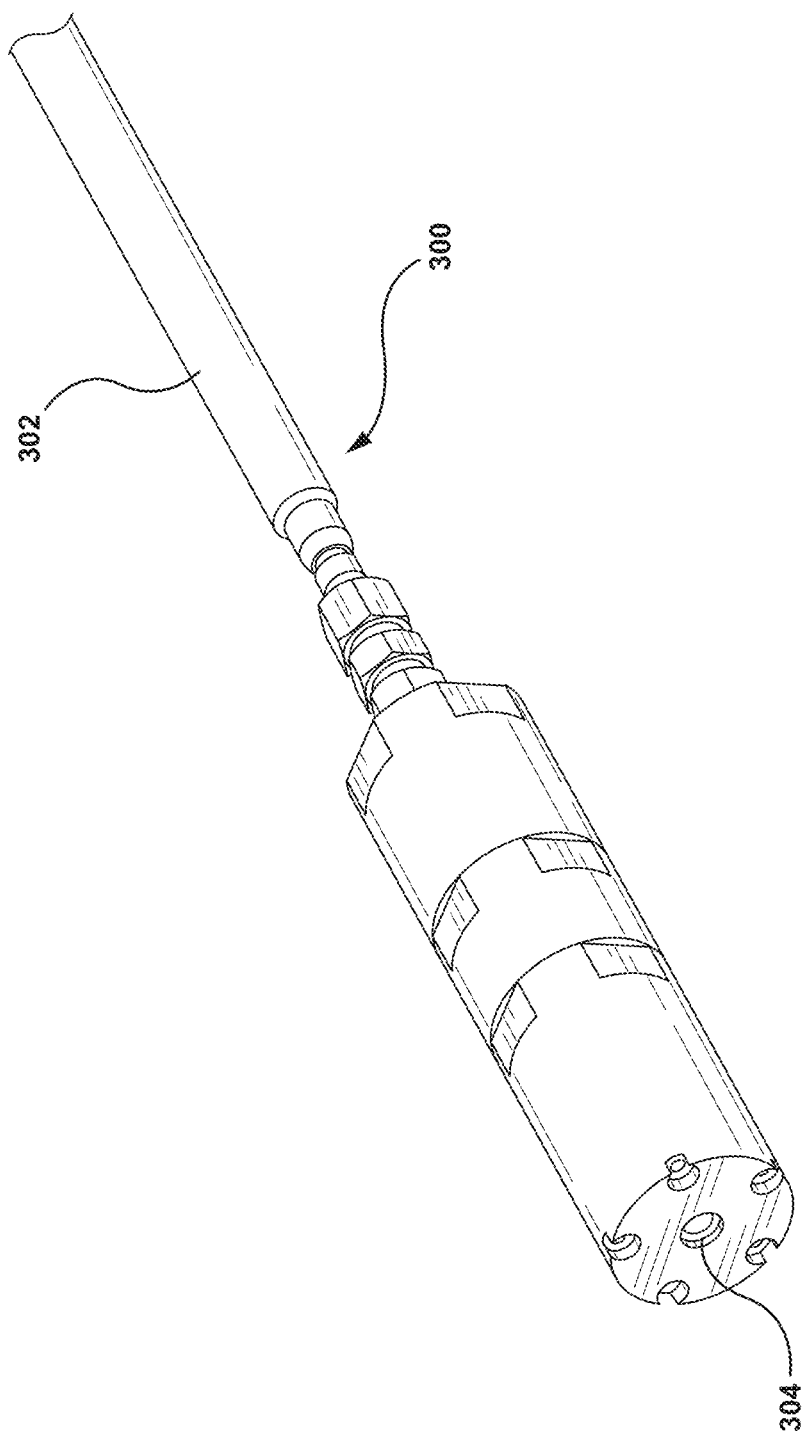
FIG. 3 is a diagram of an optical fiber pressure/level and temperature sensor.

In an example as shown in FIG. 2, there is a fiber optic sensor system 200 having a multitude of fiber optic cables 202 and one ODAQ 102, where at each respective point 204 on each cable a multitude of parameters 206 including but not limited to temperature, liquid and gas pressure, mechanical strain, liquid level, vibration and deformation are measured simultaneously. An example sensor and transducer 300 structure for monitoring of pressure/level and temperature is shown in FIG. 3 where there is a pipe 302 and a liquid/gas (i.e. a fluid) port 304.

FIGS. 4A and 4B show additional detail of the sensor and transducer 300. FIG. 4B is an end view from B-B. Line A-A is a longitudinal axis along transducer 300. In one example, the pressure/level and temperature sensor body 402 is made of 3 chambers (Chamber 1, Chamber 2, and Chamber 3). Chamber 1 has a flexible component (i.e., bellows 404) that expands, or deflects (i.e., elongates) or collapses (shrinks) as a result of the change in the pressure or level of liquid. The bellows is exposed from one end (e.g. via a port 304 in the cap 406 to liquid or gas. The deformation of the bellows is transferred to another flexible component (shown as a ring 408) resulting in the deformation of the ring along the A-A axis (FIG. 5A). The ring is secured at two points (C and D) to the bellows and one end of the body of Chamber 1 opposite the cap end. The connection points at C and D can be made of welding or gluing joints or can be made by using bolts and screws (e.g. 412). The bellows is welded or glued on the cap which is bolted (securely fixed) to a free end of Chamber 1. A fiber optic cable 410 is embedded or mounted on the ring element and the deformation of the ring is transferred to the fiber optic resulting in mechanical deformation (i.e., axial strain) on the fiber optic cable. The fiber optic cable can be attached to the ring at one or multiple points on the perimeter of the ring (e.g. in a channel along a portion of the circumference of the ring). In case of multi-point attachment, each point will be exposed to a unique deflection per applied external pressure. Due to the circular geometry of the ring, the distribution of strain along the perimeter of the ring is non-uniform. The strain at points C and D is zero and at point E it reaches its maximum value. As a result, multiple points on the fiber will be exposed to multiple strain values when the ring is deflected.

Chamber 1 and Chamber 2 are connected through a hole where the fiber optic passes through. From Chamber 2 to Chamber 3 there is a fiber optic seal fitting 414 to isolate Chamber 2 and Chamber 1 from the external fluid. Chamber 3 is connected to a liquid/gas fitting 416 connected to a pipe (see FIG. 3) in which the fiber optic passes through to other sensing points or to a data acquisition system. Ideally, the liquid/gas fitting can isolate all chambers from external fluid. However, the fiber optic seal fitting is implemented as an additional level of protection.

The fiber optic seal fitting is shown in more detail in FIG. 5. The fitting 414 includes a ferrule 502 (made of a conical polymer element with a co-axial pre-drilled hole). The size of the pre-drilled hole is determined based on the diameter of the fiber optic cable. The ferrule is inserted in a compression pipe fitting. Tightening of the compression fitting will result in sealing the fiber optic pre-drilled hole.

Another example of the pressure/level and temperature sensor 300A is shown in FIGS. 6A and 6B where 6A is a CAD illustration showing external structures and 6B is a CAD illustrations also showing internal structures and fiber optic 410. Features in sensor 300A are similarly numbered as in FIGS. 3, 4A and 4B. The transducer 300A has a flexible component (i.e., bellows 404) connected at one end to the pressure port 304 inside a cap 406 and is in contact with a beam 408A on the other end. The deformation (i.e., elongation) of the bellows due to the changes in pressure is transferred to the beam resulting in the deflection of the beam. The beam is interlocked (mounted) at two ends (Points A and B) to the main chamber body 402A. A fiber optic cable 410 is mounted (e.g. embedded) in the beam (e.g. in a channel along a longitudinal length of the beam). The fiber optic can be embedded at a single or multiple points on the beam. The deformation of the beam results in axial mechanical strain on the embedded sections of the fiber. Depending on the locations of the fiber embedding on the beam, the embedded points are exposed to equal or non-equal axial strain values.

The example of FIGS. 4A and 4B and the example of FIGS. 6A and 6B each have flexible components with embedded fiber optic sensors. The flexible component can be made of metallic and non-metallic materials. Generally, the flexible component can be made of any material that has mechanical compliance, i.e., can be deformed as a result of applied loading.

Figure 7B:
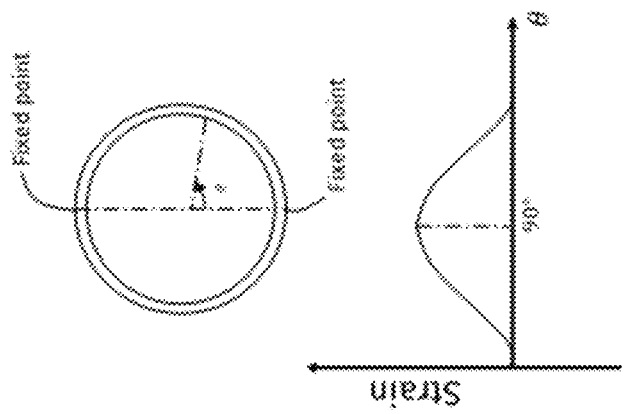
FIGS. 7A and 7B are graphical representations showing the distribution of strain in the flexible elements (beam and ring) in which fiber optic is embedded.
Figure 7A:
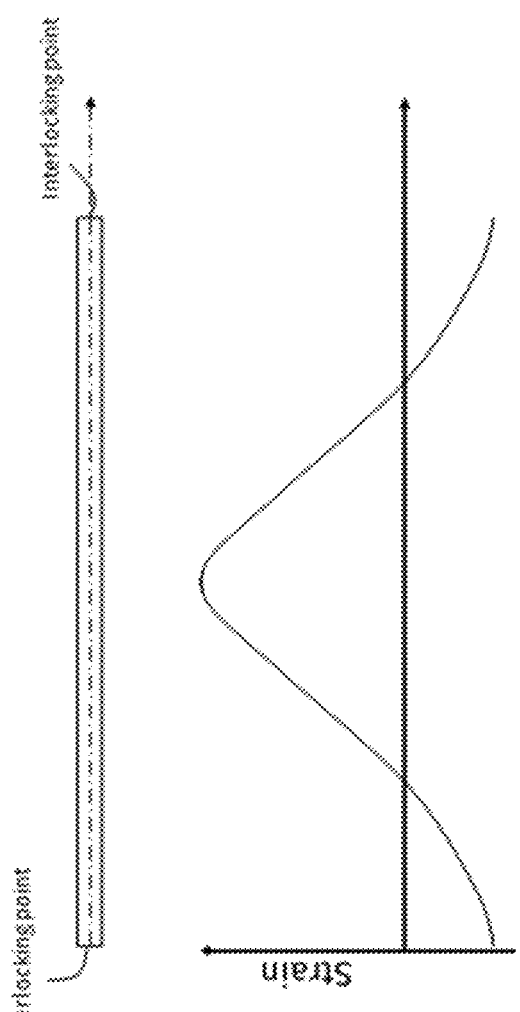

The distribution of strain in the respective beam (FIGS. 6A and 6B) and ring (FIGS. 4A and 4B) examples as a result of the deflection is graphically represented in FIG. 7. To achieve multi-parameter sensing the fiber is bonded on the flexible membrane in such a way that strain will distributed unevenly along the length of the fiber optic.

Fiber embedding process is a multi-stage process. In one method, the sections of the fiber optic to be embedded are coated with a conductive thin-film layer (i.e., metal nano particle suspensions such as silver nano-particle suspension) and thermally cured. Fiber coating can also be conducted through a controlled dipping process, in which the fiber optic is inserted and moved in a liquid along its longitudinal axis and the surface tension will allow the fiber to be coated by the liquid. Fiber optic coating can also be conducted through physical deposition methods (such as Physical Vapor Deposition (PVD) or sputtering) or chemical deposition methods (such as Chemical Vapor Deposition). The thickness of the coating on the fiber varies between 20 nanometer and 10 micrometer and is a function of the coating material and deposition process. Thermal curing is conducted either by bulk heating (using furnace or hot plate) or point and localized heating using laser or infra-red heat sources. Both bare fiber optic (fiber optic with no jacket) and fiber optic cables with standard acrylate or polyimide coatings can be used in this process without removing the jackets. The coated fiber is then placed in a pre-cut groove on the flexible membrane (beam or ring) (e.g. in groove 1002A of FIG. 8A or in groove 1002 of FIG. 8B) and the groove is filled with metallic liquid suspension (such as nanoparticle suspensions) or polymeric adhesive. The assembled fiber and flexible membrane will then go through a thermal curing process either by bulk heating (using furnace or hot plate) or point and localized heating using laser or infra-red heat sources. In order to increase the accuracy of the embedding process, the groove filling process could be conducted through controlled dispensing using an automated drop-on-demand deposition process (such as microscale additive manufacturing processes). In another embedding process the fiber could be embedded inside the metal using electron-beam welding or laser welding. In such processes, the groove walls in which fiber optic is placed are locally melted and after solidification, a solid layer is formed around the fiber optic pre-installed in the groove.

The thermal curing temperature range depends on the type of bonding material and can vary from room temperature (i.e., 20° C.) to 1000° C.

The groove in which the fiber is embedded can be made by a high accuracy CNC machine or other micromachining techniques including laser micromachining.

The depth of the groove varies between 50 micro-meter and 1 mm.

Figure 9:
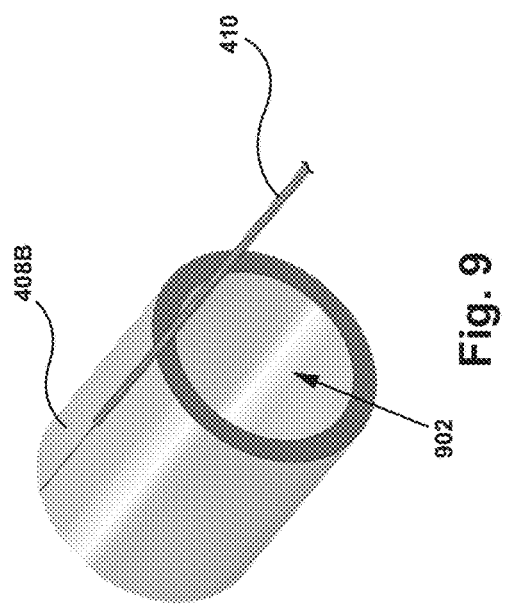
FIG. 9 shows another example of a flexible component (a hollow cylinder) in which fiber optic is embedded.
Figure 10B:
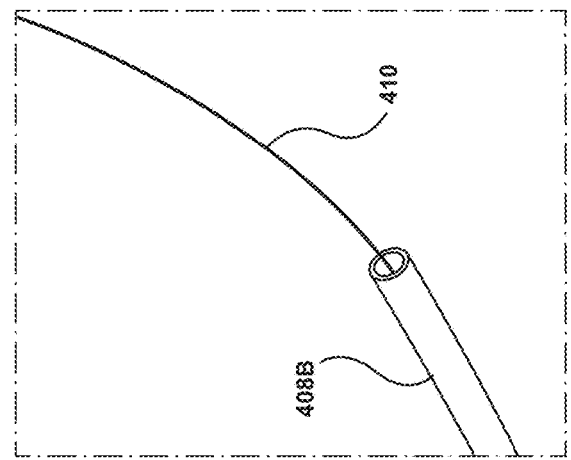
FIGS. 10A and 10B are photographs that show example images of the transducer mechanism with a fiber optic sensor embedded in a pipe (hollow cylinder)
Figure 10A:
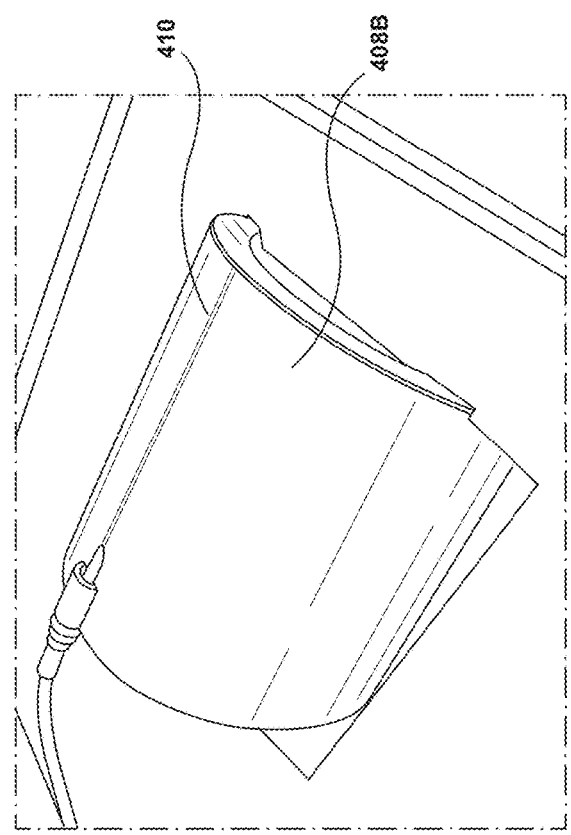
Figure 11:
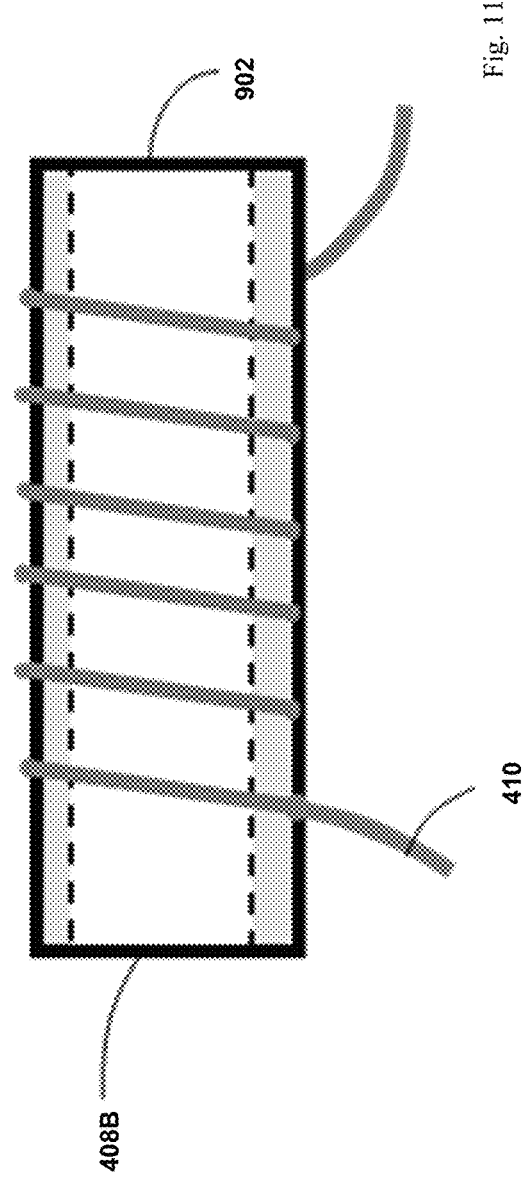
FIG. 11 is an illustration showing an optical fiber bonded or embedded on a tube in a spiral shape.

The flexible component on which the fiber 410 is bonded or embedded could be in the form of a hollow cylinder (i.e., a tube). Such a tube could replace the ring or beam of FIGS. 4A and 6B. The fiber 410 could be embedded in a straight direction, spiral, or any other curved path on the pipe (see FIG. 9 showing a flexible tube 408B having fiber optic 410 mounted along its axis and pressure applied in the interior 902 change the pipe to stress the fiber optic 410. The example of FIG. 9 is also shown in a photograph of FIG. 10A. In another example, the fiber is embedded inside the cylinder tube wall (See the photograph in FIG. 10B). In an example, the fiber is embedded or bonded to the tube in a spiral shape. The pressurization of the tube from inside will impose non-uniform strain along the fiber optic (See FIG. 11).

In general, any flexible body with regular or un-regular shape could be used as a flexible component for bonding the fiber optic. The yield strength of the flexible body should be high enough that it will not be plastically deformed as a result of applied load. Although it is ideal to have a flexible material with linear response (linear deformation vs load without hysteresis and memory effects), any non-linearity could be compensated by calibration. The magnitude of strain in all these cases could be between −4000 to 4000 microstrain; this range is a function of the shape, geometry, and material of the flexible component.

The embedding process could also be conducted through electroplating or electroless plating process. In this process, the coated sections of the fiber are placed in the pre-cut groove, and the beam-fiber assembly is placed in an electroless plating or electroplating bath. In the electroless or electroplating bath metal particles are deposited on the coated fiber and the groove and will result in the embedding of the fiber in the flexible membrane. The electroless or electroplating process can only be applied to flexible components made of metals or pre-coated with a conductive layer. The most common method of electro or electroless plating is Nickel plating; however, a wide range of metals can be used in this process such as gold, silver, and chromium. The thickness of the coating on the fiber varies between 100 nanometer and 2 mm.

The optical signal demodulation to obtain the measurement values is conducted through the measurement and analysis of the optical reflection spectrum from the optical fiber.

Figure 12:
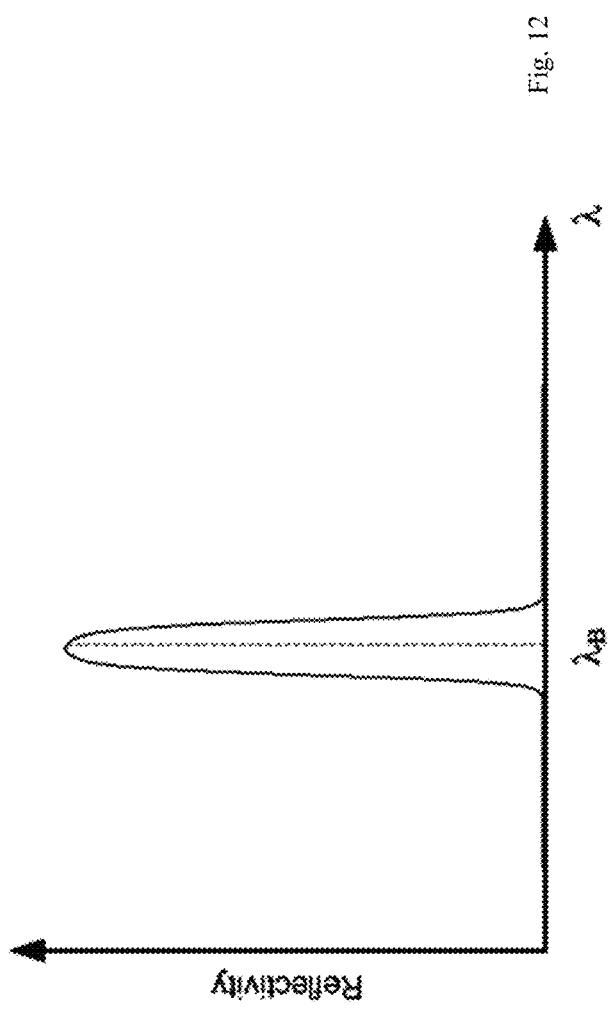
FIG. 12 is a graph that illustrates the reflection spectrum from a fiber Bragg grating.
Figure 13:
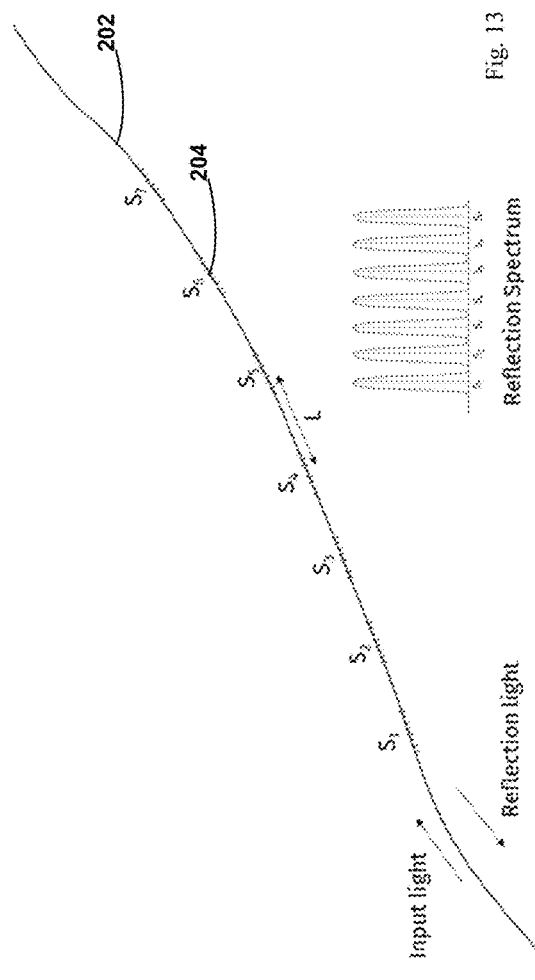
FIG. 13 shows the distribution of strain in the flexible elements (beam and ring) in which fiber optic is embedded.

In examples, the locations of the fiber embedded or bonded to the flexible components are pre-inscribed with fiber Bragg gratings (FBGs). Usually, the gratings are inscribed before adding the thin film layers. FBGs are periodic modulations of the index of refraction which are laser-inscribed inside the core of optical fiber. FBGs result in the reflection of the light at a certain wavelength, called Bragg wavelength ($\lambda_B$), which is a function of the period of the grating modulation ($\Lambda$) and the effective mode index of refraction ($n_{eff}$) in the optical fiber, i.e. $\lambda_B=2n_{eff}\Lambda$. The shape and the location of the reflection spectrum (FIG. 12) is a function of the distribution of strain and temperature along the FBG. A multitude of FBGs can be inscribed on a single fiber optic cable 202 at points 204 (e.g. $S_1$, $S_2$, ... $S_7$) spaced a distance L from each other to receive and reflect light (FIG. 13). The distance L between the FBG locations could vary between 10 cm and a few kilometers.

Figure 14:
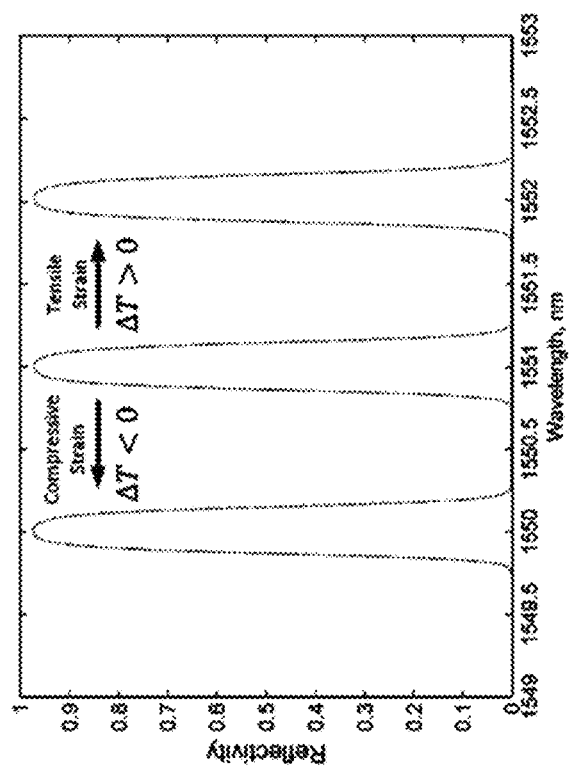
FIG. 14 is a graph showing the effect of uniform strain or temperature on the reflection spectrum of FBG.
Figure 15:
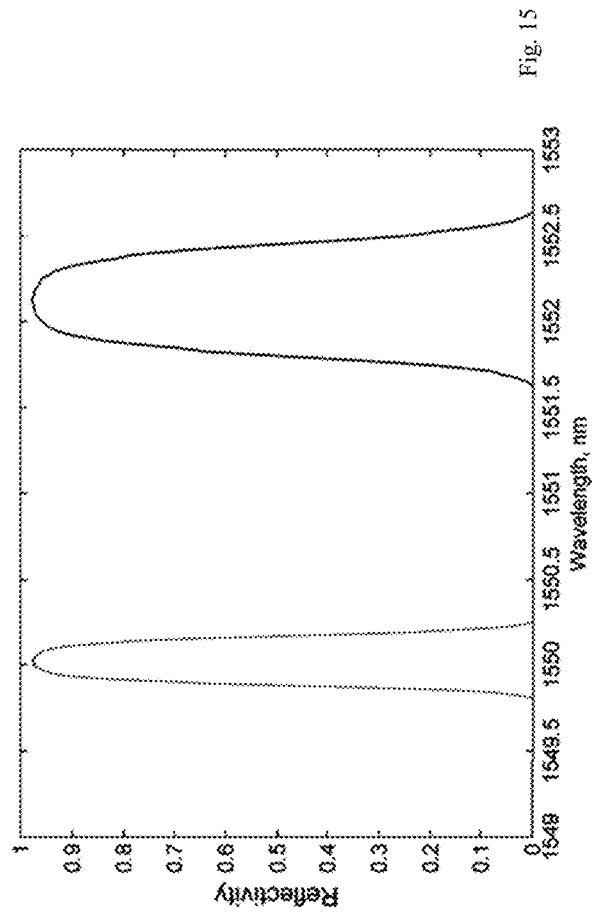
FIG. 15 is a graph showing the effect of non-uniform strain or temperature on the reflection spectrum of FBG.

As an example, uniform temperature or strain along the FBG only causes shift in the Bragg wavelength (FIG. 14) while non-uniform strain or temperature causes the deformation of the reflection spectrum, i.e. broadening (FIG. 15).

In the aforementioned transducer design, the embedded locations on the fiber could be part of a single FBG or each point can have a different Bragg grating. In the former case, the signal analysis will be based on the demodulation of one reflection spectrum and in the later case the signal analysis will be based on the demodulation of multiple reflection spectrums. In both cases, the reflection spectrum may shift or change its shape as a result of the deformation in the flexible component on which the fiber optic cable is bonded or embedded.

Figure 16:
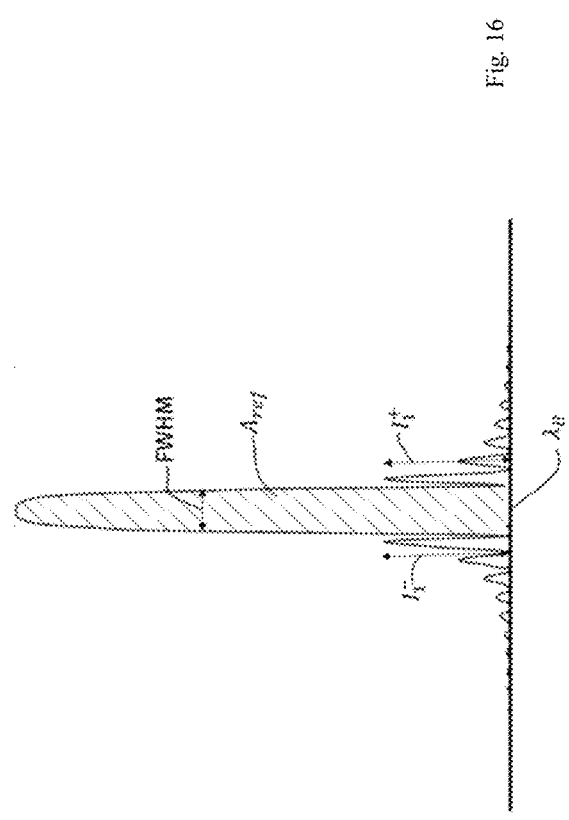
FIG. 16 is a graph that shows the parameters used to decode the reflection spectrum of each FBG, in case of using FBG as the sensor element.

Each FBG reflection spectrum is analyzed based on the following parameters (FIG. 16):
a. Shift of Bragg wavelength ($\lambda_B$)
b. Change in the bandwidth of the reflection spectrum, i.e. Full Width at Half Maximum (FWHM)
c. Area under the reflection spectrum ($A_{ref}$)
d. Intensity of side lobes in the reflection spectrum ($l_1^+$, $l_1^-$)

Table 1 lists the effect of temperature and mechanical load (pressure, change in level, and mechanical strain) on each of these parameters:

TABLE 1

Effect of temperature and strain on the shape parameters of FBG

| | $\lambda_B$ | FWHM | $A_{ref}$ | $(I_1^+, I_1^-)$ |
|---|---|---|---|---|
| Increase in temperature or strain (zero gradient along FBG) | Increase (max change: 20 nm) | Unchanged | Unchanged | Unchanged |
| Decrease in temperature or strain (zero gradient along FBG) | Decrease (max change: −20 nm) | Unchanged | Unchanged | Unchanged |
| Increase in temperature or strain (non-zero gradient along FBG) | Increase (max change: 20 nm) | Increase (max change: 1 nm) | Increase (max change: 200%) | Depends on gradient (range 0 to 100% of maximum peak intensity at $\lambda_B$) |
| Decrease in temperature or strain (non-zero gradient along FBG) | Decrease (max change: −20 nm) | Increase (max change: 1 nm) | Increase (max change: 200%) | Depends on gradient (range: 0 to 100% of maximum peak intensity at $\lambda_B$) |

The examples of sensors explained above (e.g. FIGS. 4A, 4B and 6A and 6B as well as FIGS. 9, 10A, 10B and 11) can be used for multi-point or distributed sensing of multiple parameters. To achieve this, the sensing elements can be assembled in a serial (FIG. 17) or star configuration (FIG. 18).

The aforementioned invention for pressure/temperature/level sensing has the ranges and accuracy levels described in Table 2.

TABLE 2

Technical specifications of the pressure/temperature/level sensor

| Measured Parameter | Range | Resolution | Accuracy |
|---|---|---|---|
| Pressure | 0 to 10,000 psi - Gauge pressure | 0.02% of the full scale | 0.2% of full scale |
| Temperature | Low temperature: −55° C. to 300° C. High temperature: −55° C. to 800° C. | 0.01° C. | 0.1° C. |

Figure 19:
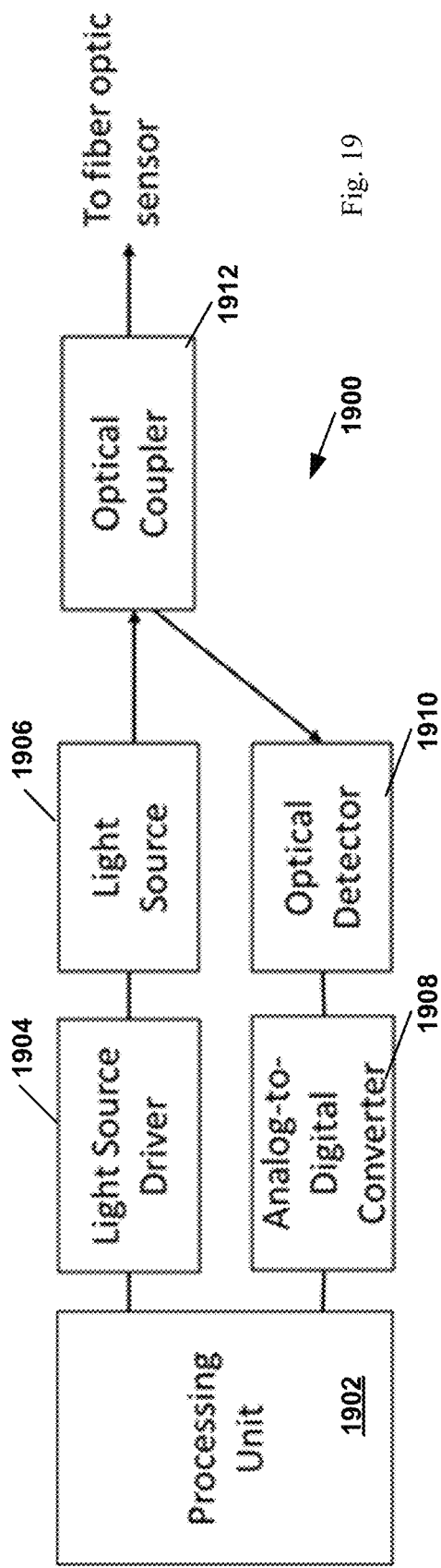
FIG. 19 is a diagram of an optical data acquisition unit to monitor optical fibers.

The fiber optic cable can be monitored by any optical data acquisition system that has the capability for generating light (i.e., lasers, light emitting diodes, or broadband light source) and an optical power detector. These units are commercially available or can be designed and built by integrating standard OEM components. FIG. 19 shows an exemplary diagram of an optical data acquisition system 1900. System 1900 comprises a processing unit 1902 (e.g. one or more micro processors) to control light actuation and the processing of reflected light (signals) from the sensors. A light source driver 1904 is coupled to processing unit 1902 and to a light source 1906. An analog to digital converter 1908 is coupled to processing unit 1902 and to an optical detector 1910. An optical coupler 1912 is coupled to each of a light source 1906 to receive light actuated from by the processing unit for delivery to fiber optic cable coupled to the sensors (not shown) as well as to the optical detector 1910 where optical delivers received reflected light from the sensors for further delivery for processing by processing unit 1902. System 1900 may define an optical data acquisition (ODAQ) such has for monitoring sensors on a single cable.

Figure 20:
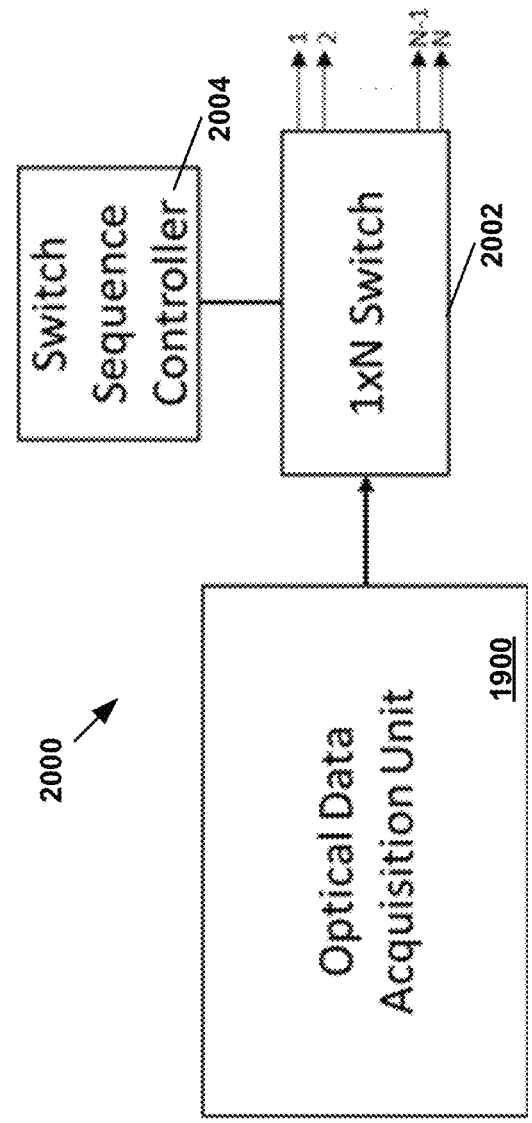
FIG. 20 is the diagram of an optical data acquisition unit to monitor multiple cables at the same time.
Figure 21B:
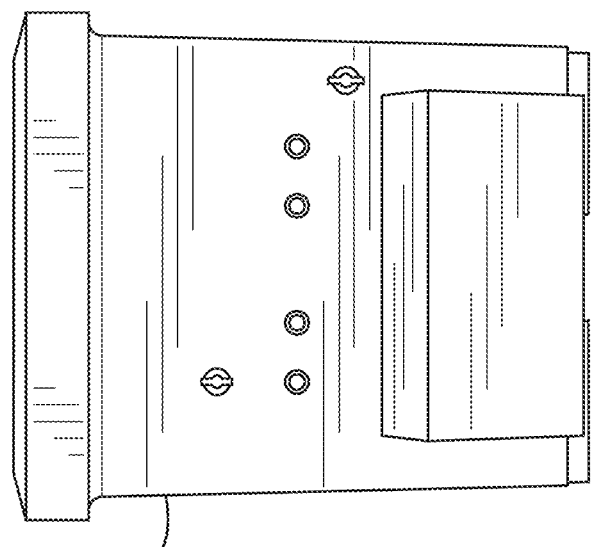
FIGS. 21A and 21B are commercial versions of optical data acquisition units with 1×4 and 1×32 channel switches.
Figure 21A:
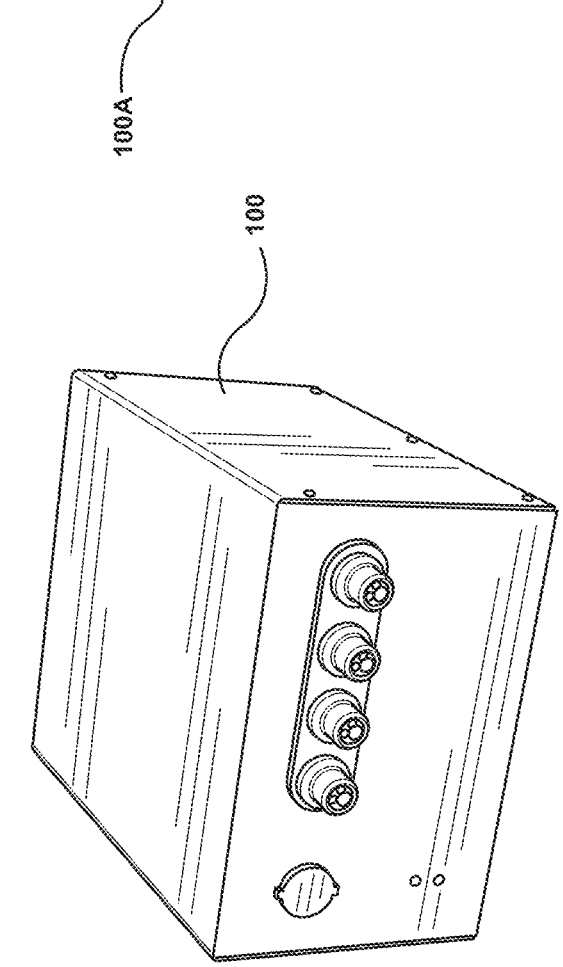

In an example, an optical data acquisition unit (e.g. a system 1900) can be combined with a micro-electromechanical switch 2002 to form architecture 2000 to monitor multiple cables (FIG. 20). System 200 has a processing unit 2004 to control switch 2002 (a switch controller) to generate the sequence of switching. This architecture 2000 is used to convert a single-channel optical data acquisition unit to a multi-channel data acquisition unit. FIGS. 21A and 21B are photographs showing AOMS Technologies' commercial versions 100 and 10A of an optical data acquisition unit with a 1×4 and 1×32 switches respectively.

Figure 22:
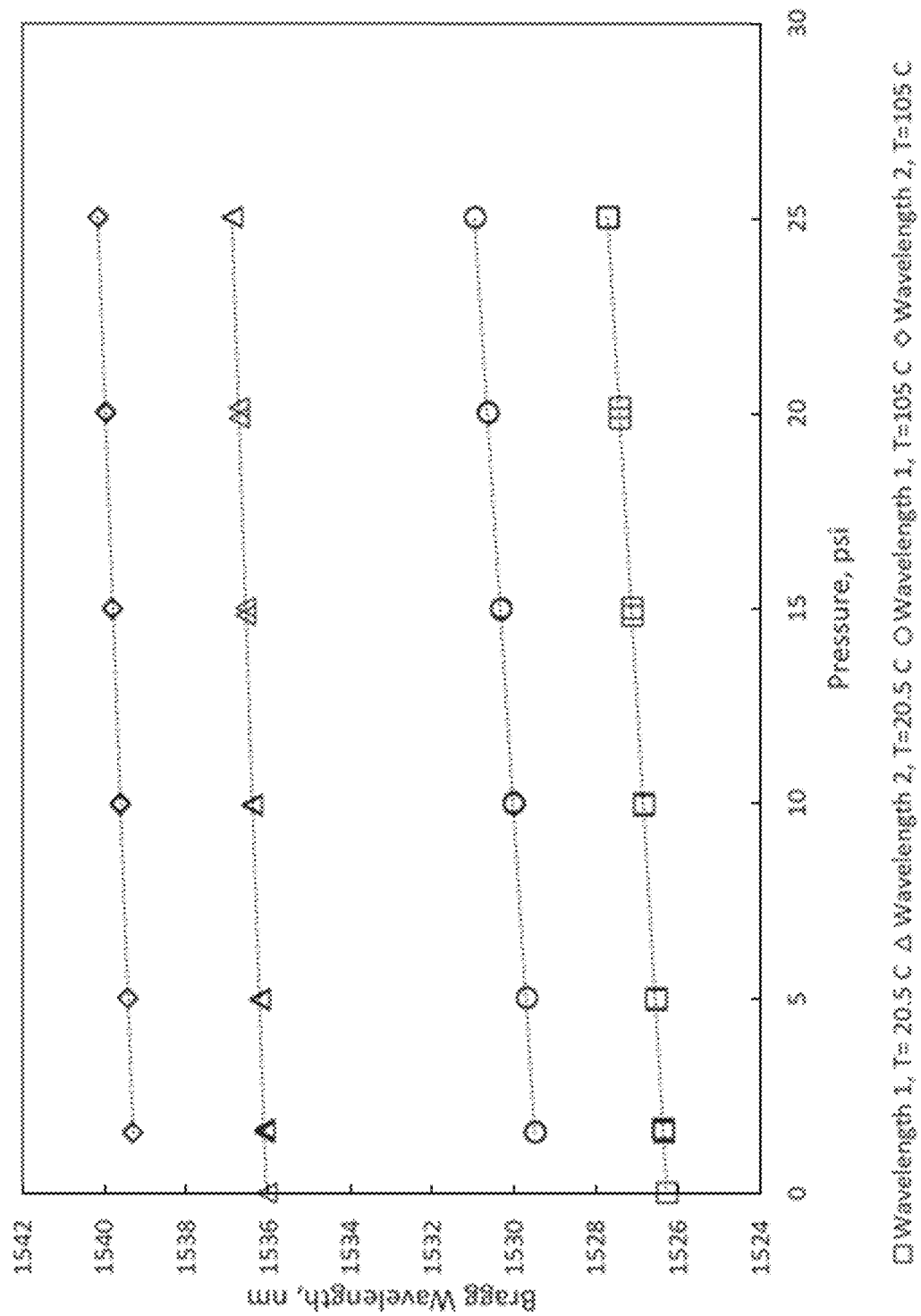
FIG. 22 shows a fiber optic sensor response to pressure at different temperature levels (20.5° C. and 105° C.) for a fiber with two FBG sensors embedded in a ring structure.

FIG. 22 is a graph that shows the response of a fiber optic sensor to pressure at different temperature levels. The sensor is a combination of two FBGs bonded to a flexible ring made of aluminum. As seen the two FBG Bragg wavelength ($\lambda_1$ and $\lambda_2$) have different sensitivities to pressure. For this specific type of fiber optic sensor, pressure is correlated to $\lambda_1$ and $\lambda_2$ according to the following equation:

$$P=+A_1\lambda_1^2+A_2\lambda_1+B_1\lambda_2^2+B_2\lambda_2+C$$

where $A_1$, $A_2$, $B_1$, $B_2$, and C are constant numbers. This formula has temperature compensation embedded in it. However, temperature can be obtained from a different formula, as follows:

$$T=D_1\lambda_1^2+D_2\lambda_1+E_1\lambda_2^2E_2\lambda_2+F$$

Figure 23:
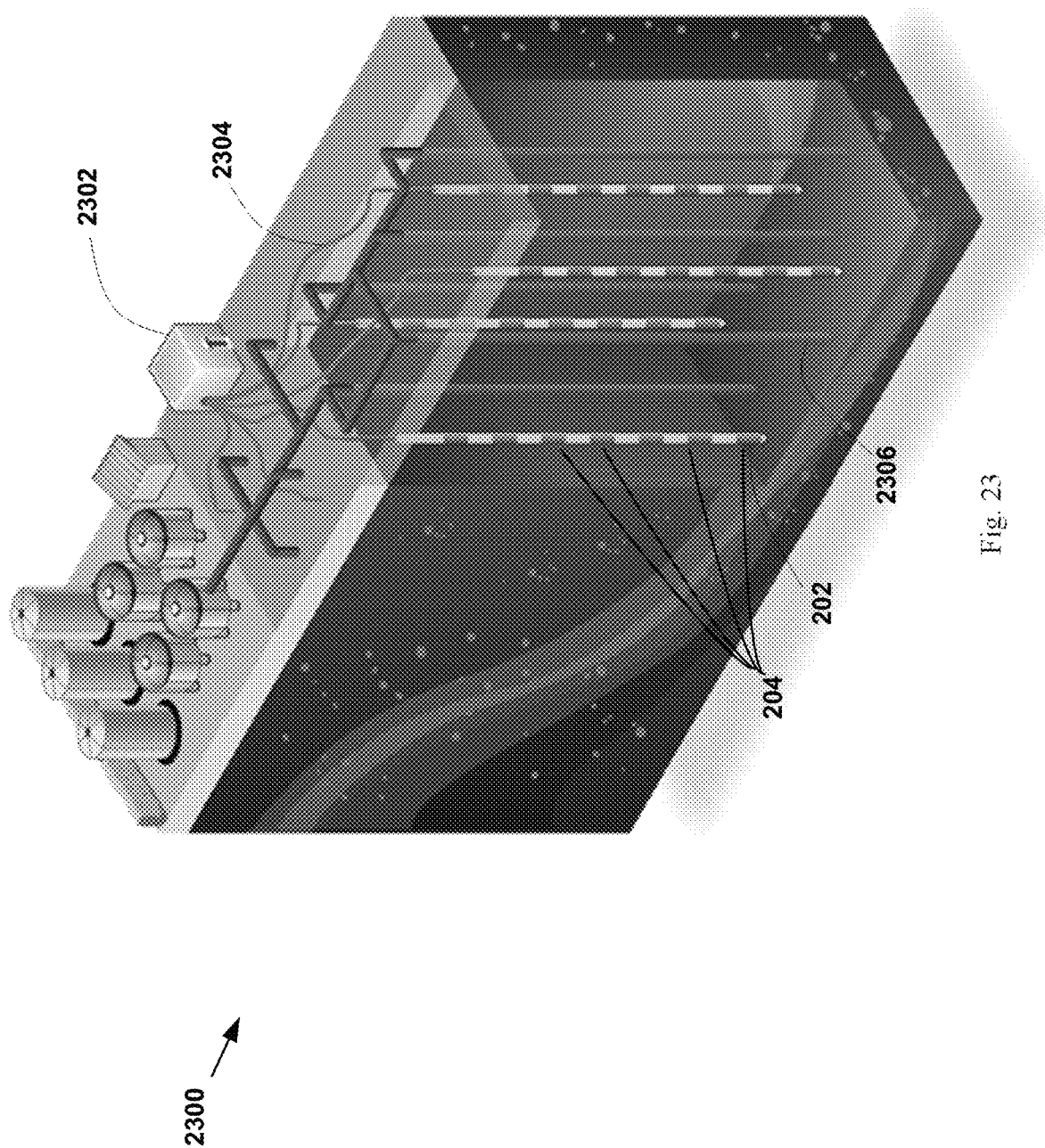
FIG. 23 is a schematic diagram of the fiber optic sensor implementation for subterranean measurements in in-situ thermal remediation.

This invention has several industrial applications. One of the applications is the monitoring of the groundwater level and temperature during in-situ thermal remediation (ISTR). ISTR is an industry standard process for remediating contaminated lands. In this process, heating electrodes are inserted into the soil and cause the evaporation of the contaminants which are then collected through a vacuum extraction system. Measurement of groundwater level is important to obtain the hydraulic gradients in the water table and get insight into the direction of the movement of contaminated substances. FIG. 23 is a graphical illustration showing an example groundwater measurement installation 2300 where a fiber optic data collection and analysis hub 2302 comprising an example of architecture 2000 is coupled to a plurality of fiber optic extension cables 2304 (only one is identified) coupled respectively to sensor cables 202 (only one is identified) in a star configuration similar to FIG. 18. Each sensor cable has a plurality of sensors 204 (only some of which are identified). Heating rods 2306 (only one of which is identified) may heat the environment about the sensor cables 202 and this environment may be measured for various parameters. Heating rods 2306 may comprise a component of an in-situ thermal remediation system.

Figure 24:
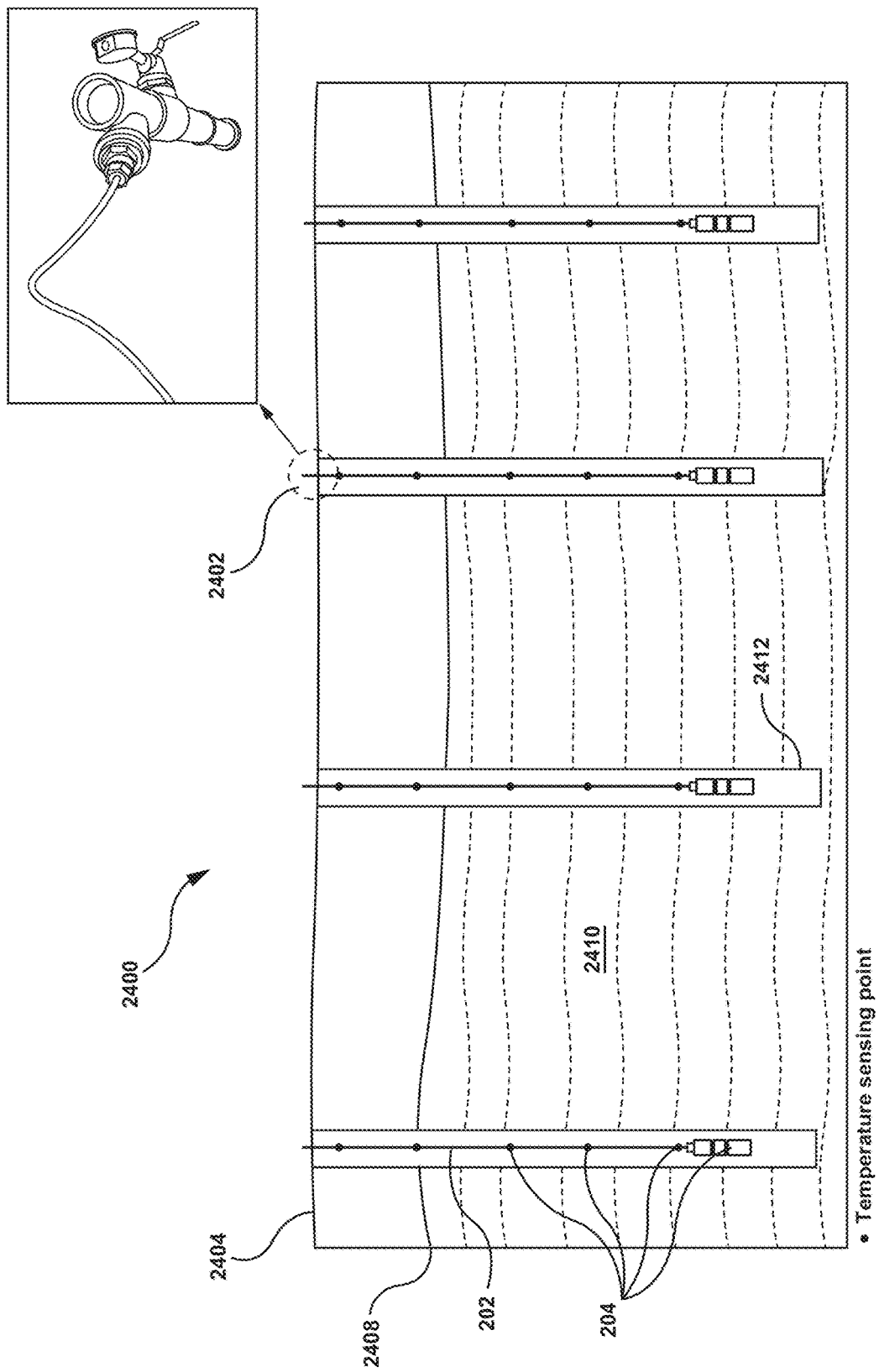
FIG. 24 is an illustration of an implementation of fiber optic sensors for the measurement of temperature and groundwater level.
Figure 25:
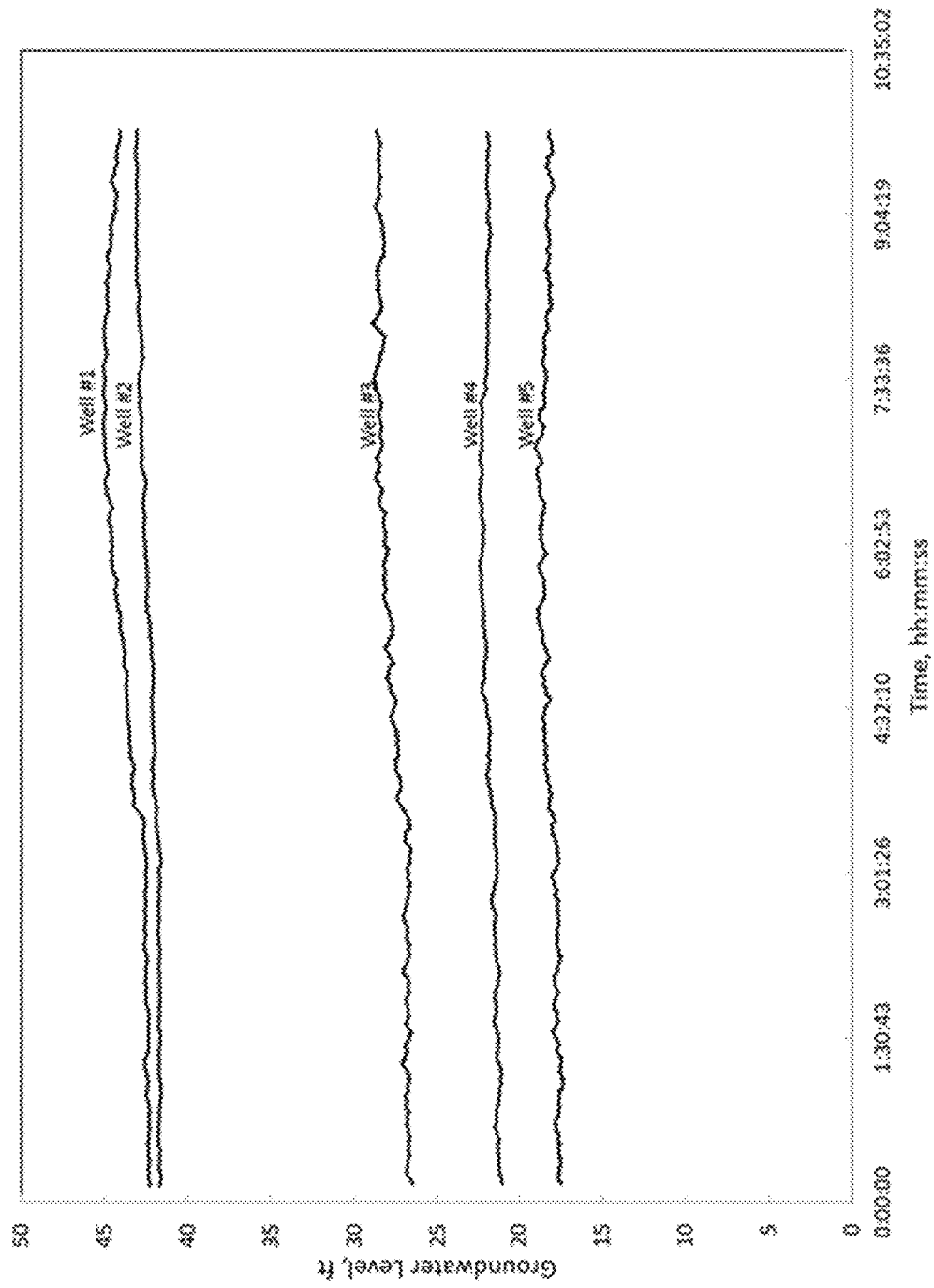
FIG. 25 is a graph that shows the groundwater level variations in 5 wells across a remediation site over a 9 hour period obtained by 5 optical fiber pressure/level sensors.

FIG. 24 is an illustration of a portion of an installation 2400, such as in a remediate field, of sensor cables 202 with sensors 204 in a star configuration with a photograph highlighting a ground level coupling point 2402 for a sensor cable 202. The cables 202 are in an environment comprising a ground surface 2404 where the coupling 2402 is located. Below the surface in an unsaturated zone 2406 and further below is a water table 2408 of ground water 2410. The sensor cables 202 may be in wells (e.g. 2412). Each sensor cable may have a plurality of temperature sensing points and, at the distal end of the cable, a pressure sensing point. FIG. 25 is an example graph that shows the variation of groundwater level obtained by 5 fiber optic pressure/level sensors across a remediation field.

In an in-situ thermal remediation field (environment) and with reference to FIGS. 23 and 24 as examples, vertical wells are drilled into the ground to a specific depth determined by the remediation project requirements. Sensor cables (fiber optic sensor cables) are lowered into the wells and secured at the surface. The sensor cables have equally spaced sensors (multi-point sensors) measuring subsurface temperature. Combining multiple cables with multi-point sensors can generate a 3D dimensional subsurface thermal map. The data is used to for remediation performance monitoring—the contamination remedial process is a function of temperature. The remediation process involves heating the soil and groundwater to a target temperature using an in-situ remediation system. The target temperature varies depending on the geology and type of contamination chemicals. The thermal data may be used to vary the heating process, to increase or decrease the temperature, modify the rate of change or maintain a temperature, for example, in one or more regions of the field. The thermal data can also be used to optimize the input heating energy which is generated by electricity or gas by or for the in-situ remediation system.

In another type of installation, sensor cables with a level sensor point at the end of the cable are lowered in pre-drilled wells down to the groundwater to measure the groundwater level during a remediation project. These cables might have temperature sensing points along the cable in addition to the level sensor at the end of the cable. The level sensor data is used to calculate the hydraulic gradients and mobility of the contaminants during the remediation project.

Both thermal and groundwater level sensor data are required for process performance monitoring and contractual requirements. The data is also used for feedback control of the remediation process. The fiber optic sensor system is applicable to a wide range of in-situ thermal remediation technologies including electric resistance heating (ERH), thermal conduction heating (TCH), steam-enhanced extraction (SEE), and gas thermal heating. In general, the fiber optic sensor system can be applied to any in-situ thermal remediation technology regardless of the type of heating technology. A limiting factor for installation is the diameter of the sensor cable which is an engineering design parameter.

In addition to fiber Bragg gratings, other types of fiber optic sensors can be used in this invention. In an example, the sections of the fiber optic embedded, encapsulated, or bonded is one or a multitude of in-fiber Fabry-Perot interferometers (also known as fiber Fabry-Perot cavity), where each in-fiber Fabry-Perot interferometer is made of two reflection planes separated by a known distance and where the reflection planes are in-fiber Bragg gratings.

In an example, the sections of the fiber optic embedded, encapsulated, or bonded has no in-fiber structures and the sensing of external parameters is based on the scattering of light from the optical fiber including, Raman scattering, Rayleigh scattering, and Brillouin scattering.

In an example, at least one section of the fiber optic embedded, encapsulated, or bonded is made of Photonic Crystal Fiber (PCF).

In an example, at least one section of the fiber optic embedded, encapsulated, or bonded is made of microstructured fiber optics.

Throughout the description and claims of this specification, the word "comprise" and "contain" and variations of them mean "including but not limited to" and they are not intended to (and do not) exclude other components, integers or steps. Throughout the description and claims of this specification, singular encompasses the plural unless the context requires otherwise. In particular, where the indefinite article is used, the specification is to be understood as contemplating plurality as well as singularity, unless the context requires otherwise.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, ma be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

What is claimed is:

1. A process of manufacturing comprising:
   coating a portion of a fiber optic cable with a thin film layer;
   placing the portion of the fiber optical cable as coated in a channel of a fiber carrying flexible member for a fiber optic sensor; and
   embedding the portion of the fiber optical cable as coated in the channel using one of:
   a thermal curing process after filling the channel with a metallic liquid suspension or polymeric adhesive; and
   an electroplating or electroless plating process.

2. The process of claim 1 wherein filling the channel comprises performing a controlled dispensing using an automated process.

3. The process of claim 2 wherein the automated process comprises an automated drop-on-demand deposition process.

4. The process of claim 1 wherein the thin film layer is a conductive thin film layer.

5. The process of claim 1 further comprising:
   assembling the fiber carrying flexible member and the portion of the fiber optical cable as coated, as embedded, in a housing body with an expanding/collapsing capable flexible member;
   wherein a first surface of the expanding/collapsing capable flexible member is exposed at one end, through a port in the body, with the immediate external environment to the sensor, the expanding/collapsing capable flexible member changing size in response to changes in pressure or level of liquid in the immediate external environment;

wherein the fiber carrying flexible member is coupled to and housed in the body and further coupled to a second surface of the expanding/collapsing capable flexible member such that an expanding or collapsing of the expanding/collapsing capable flexible member changes a shape of the fiber carrying flexible member; and wherein at least one end of the fiber optic cable extends out through the body.

6. A process of manufacturing comprising:

placing a coated or uncoated portion of a fiber optical cable in a channel of a flexible member for a fiber optic sensor; and using micro-laser welding or electron beam welding to locally melt the flexible member areas adjacent to the fiber optic resulting in the flow of the melted liquid around the fiber to create a solid structure with embedded fiber after solidification.

* * * * *